United States Patent
Thomas (10) Patent No.: US 11,087,445 B2
(45) Date of Patent: *Aug. 10, 2021

(54) SYSTEMS AND METHODS FOR THREE-DIMENSIONAL ENVIRONMENTAL MODELING OF A PARTICULAR LOCATION SUCH AS A COMMERCIAL OR RESIDENTIAL PROPERTY

(71) Applicant: Quasar Blu, LLC, Woodstock, GA (US)

(72) Inventor: Mark Thomas, Woodstock, GA (US)

(73) Assignee: QUASAR BLU, LLC, Woodstock, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/833,798

(22) Filed: Mar. 30, 2020

(65) Prior Publication Data

US 2020/0226730 A1    Jul. 16, 2020

Related U.S. Application Data

(63) Continuation-in-part of application No. 16/457,569, filed on Jun. 28, 2019, now Pat. No. 10,607,328, (Continued)

(51) Int. Cl.
*G06K 9/36* (2006.01)
*G06T 5/50* (2006.01)
(Continued)

(52) U.S. Cl.
CPC ............. *G06T 5/50* (2013.01); *G06T 7/70* (2017.01); *G06T 15/503* (2013.01); *G06T 2207/20221* (2013.01); *G06T 2207/30244* (2013.01)

(58) Field of Classification Search
CPC ..... G06T 5/50; G06T 7/70; G06T 2207/30244; G06T 2207/20221; G06T 2207/20212;
(Continued)

(56) References Cited

U.S. PATENT DOCUMENTS 7,034,861 B2    4/2006    Okada et al.
7,548,833 B2    6/2009    Ahmed
(Continued)

FOREIGN PATENT DOCUMENTS

CN    203606621    5/2014
WO    2007082167    7/2007

OTHER PUBLICATIONS

Barakonyi, et al., Remote Collaboration Using Augmented Reality Videoconferencing, Citations: p. 1 col. 2 Para 3- p. 2 col. 1 Para 1, p. 3 COI2 Para 2-Para 3, www.icg.tu-graz.ac.at/publications/pdf/RemoteCollaboration/download.
(Continued)

*Primary Examiner* — Samir A Ahmed
(74) *Attorney, Agent, or Firm* — Brient IP Law, LLC (57) ABSTRACT

A system, according to various embodiments, receives images such as photographs and videos from one or more portable computing devices associated with one or more individuals (e.g., construction workers or landscapers) while the portable computing devices are in a particular position within a particular location at a particular time. The system determines a virtual position within a 3-D representation of the particular location that generally corresponds to the particular position and combines the images with the 3-D representation to generate an enhanced 3-D representation of the particular location. This may allow, for example, owners of a particular property to track and quickly understand
(Continued)

construction and landscaping work that has been done on their property and to easily contact those individuals regarding that work.

20 Claims, 6 Drawing Sheets

Related U.S. Application Data which is a continuation-in-part of application No. 15/973,286, filed on May 7, 2018, now Pat. No. 10,339,644, which is a continuation of application No. 15/367,923, filed on Dec. 2, 2016, now Pat. No. 9,965,837.

(60) Provisional application No. 62/262,879, filed on Dec. 3, 2015.

(51) Int. Cl.
*G06T 7/70* (2017.01)
*G06T 15/50* (2011.01)

(58) Field of Classification Search
CPC ......... G06T 2207/10012; G06T 15/503; G06T 19/00; H04N 2013/0074; H04N 2013/0088; G06Q 30/00
See application file for complete search history.

(56) References Cited

U.S. PATENT DOCUMENTS

| | | |
|---|---|---|
| 7,693,702 B1 | 4/2010 | Kerner et al. |
| 7,909,696 B2 | 3/2011 | Beaulieu et al. |
| 8,032,481 B2 | 10/2011 | Pinckney et al. |
| 8,131,549 B2 | 3/2012 | Teegan et al. |
| 8,162,758 B1 | 4/2012 | Powers et al. |
| 8,317,613 B2 | 11/2012 | Lerner et al. |
| 8,548,308 B2 | 10/2013 | Okubo et al. |
| 8,620,146 B1 | 12/2013 | Coleman |
| 8,624,974 B2 | 1/2014 | Tsai et al. |
| 8,666,909 B2 | 3/2014 | Pinckney et al. |
| 9,032,297 B2 | 5/2015 | Lovejoy et al. |
| 9,135,955 B2 | 9/2015 | Abecassis |
| 9,159,034 B2 | 10/2015 | Pinckney et al. |
| 9,201,974 B2 | 12/2015 | Arrasvuori et al. |
| 9,235,920 B2 | 1/2016 | Girdzijauskas et al. |
| 9,405,432 B2 | 8/2016 | Vats et al. |
| 9,449,106 B2 | 9/2016 | Reese et al. |
| 9,563,984 B2 | 2/2017 | Willis et al. |
| 9,646,025 B2 | 5/2017 | Boyns et al. |
| 9,965,837 B1 | 5/2018 | Thomas |
| 10,339,644 B2 | 7/2019 | Thomas et al. |
| 10,607,328 B2 * | 3/2020 | Thomas ............... G06T 15/503 |
| 2004/0104935 A1 | 6/2004 | Williamson et al. |
| 2006/0186197 A1 | 8/2006 | Rosenberg |
| 2007/0118805 A1 | 5/2007 | Kraus et al. |
| 2007/0168208 A1 | 7/2007 | Aikas et al. |
| 2009/0238378 A1 | 9/2009 | Kikinis et al. |
| 2010/0161432 A1 | 6/2010 | Kumanov et al. |
| 2011/0022457 A1 | 1/2011 | Carney, II et al. |
| 2011/0149022 A1 | 6/2011 | Klebanov et al. |
| 2012/0323626 A1 | 12/2012 | Beauregard et al. |
| 2012/0330734 A1 | 12/2012 | Brown et al. |
| 2013/0162766 A1 | 6/2013 | Cohen |
| 2013/0218531 A1 | 8/2013 | Deichmann et al. |
| 2013/0237304 A1 | 9/2013 | Oakes et al. |
| 2014/0089223 A1 | 3/2014 | Klassen et al. |
| 2014/0132633 A1 | 5/2014 | Fekete et al. |
| 2014/0133832 A1 | 5/2014 | Sumler et al. |
| 2014/0156319 A1 | 6/2014 | Deeb |
| 2014/0278403 A1 | 9/2014 | Jacob et al. |
| 2014/0358703 A1 | 12/2014 | Stuntebeck et al. |
| 2014/0359540 A1 | 12/2014 | Kelsey et al. |
| 2016/0170998 A1 | 6/2016 | Frank et al. |
| 2017/0083953 A1 | 3/2017 | Arora |

OTHER PUBLICATIONS

Final Office Action, dated May 10, 2016, from corresponding U.S. Appl. No. 14/813,902.
Final Office Action, dated May 20, 2016, from corresponding U.S. Appl. No. 14/799,326.
Hanna Lee Communications, Inc., Louis Royer's "Show Me the Proof!" Cocktail Competition, Oct. 12, 2014, ShakeStir, pp. 1 and 2 located at http://www.shakestir.com/competitions/ctl/competitiondetails/mid/638/id/8120/louis-royer-s-show-me-the-proof-cocktail-competition.
Kurillo, et al., Real-Time 3D Avatars for Tele-rehabilitation in Virtual Reality, Citations: p. 4 Para 2, p. 6 Para 2-Para 3, http://www.eecs.berkeley.edu/~gregorij/MMVR2011.pdf.
Notice of Allowance, dated Dec. 4, 2019, from corresponding U.S. Appl. No. 16/457,569.
Notice of Allowance, dated Feb. 14, 2019, from corresponding U.S. Appl. No. 15/973,286.
Notice of Allowance, dated Jan. 9, 2018, from corresponding U.S. Appl. No. 15/367,923.
Office Action, dated Aug. 20, 2019, from corresponding U.S. Appl. No. 16/457,569.
Office Action, dated Feb. 17, 2017, from corresponding U.S. Appl. No. 14/799,326.
Office Action, dated Jan. 11, 2019, from corresponding U.S. Appl. No. 15/263,333.
Office Action, dated Mar. 20, 2017, from corresponding U.S. Appl. No. 14/813,902.
Office Action, dated Sep. 22, 2015, from corresponding U.S. Appl. No. 14/813,902.
Office Action, dated Sep. 24, 2015, from corresponding U.S. Appl. No. 14/799,326.
Office Action, dated Sep. 6, 2018, from corresponding U.S. Appl. No. 15/973,286.

* cited by examiner

SYSTEMS AND METHODS FOR THREE-DIMENSIONAL ENVIRONMENTAL MODELING OF A PARTICULAR LOCATION SUCH AS A COMMERCIAL OR RESIDENTIAL PROPERTY

CROSS-REFERENCE TO RELATED APPLICATIONS

This application is a continuation-in-part of U.S. patent application Ser. No. 16/457,569, filed Jun. 28, 2019, entitled "SYSTEMS AND METHODS FOR THREE-DIMENSIONAL ENVIRONMENTAL MODELING OF A PARTICULAR LOCATION SUCH AS A COMMERCIAL OR RESIDENTIAL PROPERTY," which is a continuation-in-part of U.S. patent application Ser. No. 15/973,286, filed May 7, 2018, now U.S. Pat. No. 10,339,644, issued Jul. 2, 2019, entitled "SYSTEMS AND METHODS FOR THREE DIMENSIONAL ENVIRONMENTAL MODELING," which is a continuation of U.S. patent application Ser. No. 15/367,923, filed Dec. 2, 2016, now U.S. Pat. No. 9,965,837, issued May 8, 2018, entitled "SYSTEMS AND METHODS FOR THREE DIMENSIONAL ENVIRONMENTAL MODELING," which claims the benefit of U.S. Provisional Patent Application Ser. No. 62/262,879, filed Dec. 3, 2015, entitled "SYSTEMS AND METHODS FOR THREE DIMENSIONAL ENVIRONMENTAL MODELING," the disclosures of each of the above-referenced patent applications are incorporated herein by reference in their entirety.

BACKGROUND

When individuals are deciding which bar or restaurant to visit at a particular time, it may be helpful for the individuals to accurately understand the current, past, and/or future human interactions and behavior that have occurred, are occurring, or will likely occur at the establishment. This is currently difficult, if not impossible, using existing technologies. Accordingly, there is currently a need for improved system and methods for determining the current, past, and/or future activities occurring at a particular location.

SUMMARY OF THE VARIOUS EMBODIMENTS

In general, a non-transitory computer-readable medium, according to various embodiments, stores computer-executable instructions for: (1) receiving, by at least one computer processor, a first image (e.g., a still image or video) taken in a first position relative to (e.g., at or adjacent to) a property (e.g., a commercial or residential property) at a first time; (2) receiving, by at least one computer processor, a second image (e.g., a still image or video) taken in a second position relative to (e.g., at or adjacent to) the property at a second time; (3) determining, by at least one computer processor, a first virtual position within a 3-D representation of the particular property that generally corresponds to the first position; (4) determining, by at least one computer processor, a second virtual position within the 3-D representation of the particular property that generally corresponds to the second position; (5) after receiving the first and second images, combining, by at least one computer processor, the first image, the second image, and the 3-D representation so that the first position of the first image generally corresponds to the first virtual position of the 3-D representation and the second position of the second image generally corresponds to the second virtual position within the 3-D representation; and (6) at least partially in response to combining the first image, the second image, and the 3-D representation, generating, by at least one computer processor, an enhanced representation of the particular property that includes the first image, the second image, and the 3-D representation of the particular property.

A computer-implemented method for generating an enhanced representation of a particular property, according to further embodiments, comprises: (1) receiving, by at least one computer processor, a first image taken in a first position within a particular location at a first time; (2) determining, by at least one computer processor, a first virtual position within a 3-D representation of the particular property that generally corresponds to the first position; (3) after receiving the first image, combining, by at least one computer processor, the first image and the 3-D representation so that the first position of the first image generally corresponds to the first virtual position within the 3-D representation; and (4) at least partially in response to combining the first image and the 3-D representation, generating, by at least one computer processor, an enhanced representation of the particular property that includes the first image and the 3-D representation of the particular property.

BRIEF DESCRIPTION OF THE DRAWINGS

Various embodiments of three dimensional environmental modeling systems and methods are described below. In the course of this description, reference will be made to the accompanying drawings, which are not necessarily drawn to scale and wherein.

DETAILED DESCRIPTION OF SOME EMBODIMENTS

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In general, systems and methods, according to various embodiments, are adapted for creating and/or modifying a 3D image of a room (or other interior space) within a building, such as a building that is under construction, for example, to provide an accurate representation of past, current, or future activity within the room, and/or the past, current, or future state of the room. The system receives information from one or more portable computing devices associated with one or more individuals who are in the room. This information may include, for example: (1) one or more images (e.g., still images, videos, or other images) captured in the room; (2) one or more audio recordings made in the room; and/or (3) location data for the one or more individuals when they were in the room and/or when they used a portable computing device or other device to capture the one or more images or one or more audio recordings referenced above; etc.

After the system receives the information from the one or more portable computing devices, the system may use the information to create and/or modify a 3-D representation of the interior of the room that shows and/or plays back: (1) one or more images that were taken at one or more particular times in the room; (2) one or more videos that were taken at one or more particular times in the room; and/or (3) the movements of one or more individuals that occurred in the room. This may, for example, allow an individual to view detailed 2-D, 3-D, and/or video images of a portion of the room as that portion existed at a past time. This may be particularly useful in allowing an individual, such as a home or building owner, to see the past state of a particular portion of a particular room (e.g., as the particular portion of the particular room existed before or during construction).

As a particular example, if multiple people within the room use an app on their portable computing device (e.g., smartphone) to capture one or more respective sets of one or more videos and/or pictures within a particular time period while in the room, the system may retrieve the respective sets of one or more videos and/or pictures along with position data that shows where the one or more videos and/or pictures were captured within the room (e.g., using GPS data, triangulation). The system may then use the GPS data along with data from each video and/or picture (e.g., images or sounds from the video) to position the 2-D video and/or picture within the 3-D image of the room so that the viewer will see the 2-D video and/or picture within the 3-D representation of the room in the appropriate location as the enhanced 3-D representation is displayed. In particular embodiments, the 3-D representation may be in the form of a computer model, an image that shows the contents of the image in a 3-D perspective, a computer animation (e.g., a 3-D or 2-D computer animation), and/or a video, etc. In various embodiments, the 3-D representation of the particular location may be a 2-D image that conveys a 3-D effect. This may, for example, allow the viewer to view a recreation of multiple conversations and the physical context that they occurred in as they happened in the room at a particular time.

In particular embodiments, the enhanced 3-D representation may include: (1) a 3-D representation of a portion of a building (e.g., the exterior of the building, or an interior portion of the building); (2) a 2-D image of a first particular construction element of the building; and (3) a second 2-D image of a second particular construction element of the building. The 3-D representation may be, for example, a 3-D representation of the exterior of a building. The first 2-D image may include, for example, a 2-D close-up image of a first sprinkler head in a courtyard adjacent the building. The second 2-D image may include, for example, a 2-D close-up image of a second sprinkler head in the courtyard adjacent the building. In this example, the enhanced 3-D representation may be a combination of the 3-D representation and the two 2-D images, where each of the 2-D images is positioned generally in (e.g., adjacent) the respective positions in which the images were taken. This would allow a user to easily understand: (1) where each of the two sprinkler heads are located relative to the building; and (2) what each of the sprinkler heads looked like at the time that they were photographed. This can be useful, for example, in helping document installation or maintenance work that is being done on the building.

In another example, the enhanced 3-D representation may include: (1) a 3-D representation of a wall within a particular manmade structure (e.g., a residential or commercial building); (2) a 2-D image of a first particular construction element of the building (e.g., plumbing that is at least partially disposed within the wall); and (3) a second 2-D image of a second particular construction element of the building (e.g., electrical work that is at least partially disposed within the wall). The 3-D representation may be, for example, a 3-D representation a room that includes the wall and flooring adjacent the wall. The first 2-D image may include, for example, a 2-D image of the plumbing (e.g., pipes, fittings, etc.) where the image was taken when the wall was unfinished, so that the plumbing can be seen in the unfinished version of the wall. The second 2-D image may include, for example, a 2-D image of the electrical work (e.g., wiring, etc.) where the image was taken when the wall was unfinished, so that the electrical work can be seen in the unfinished version of the wall. In this example, the enhanced 3-D representation may be a combination of the 3-D representation and the two 2-D images, where each of the 2-D images is positioned generally in (e.g., adjacent) the respective positions in which the images were taken. This would allow a user to easily understand: (1) where the plumbing and electrical work are positioned within the (now finished) wall; and (2) what the plumbing and electrical work looked like at the time that the respective images were taken. This can be useful, for example, in helping document construction work that was done on the building (which may be helpful in doing future construction work on the building).

Further examples may include, for example, using the 2-D images (or other images) to show the location of property boundaries, vegetation such as trees or bushes, appliances, decking, etc. before, during, or after construction or landscaping work was done involving those items. This can be helpful in documenting: (1) what items need to have work done on them (e.g., which trees need to be removed from a particular property); (2) what items were worked on; and (3) the condition of the items when the work was completed.

In particular embodiments, the system may be adapted to allow a user to select (e.g., "click" on (e.g., using a mouse or other pointer)) one or more of the 2-D images, or other images that are used to enhance the 3-D representation of the property. In response to the selection of a particular one of the 2-D or other images, the system may display notes made by an individual associated with the contents of the selected image. For example, where the selected 2-D image is an image of plumbing that was installed by a particular construction worker (e.g., plumber), the system may display notes made by the construction worker regarding the plumbing, the construction worker's contact information, etc. In particular embodiments, the system may further provide a user interface that facilitates sending an electronic message to the construction worker (e.g., a text or email), for example, regarding the construction element shown in the image. The system may, for example, automatically include (e.g., generate and include in the electronic message) an identifier of the construction project involved (e.g., a project number or other reference number) to help the construction worker recall the project.

It should be understood that many variations of the above construction-related examples may come to mind in light of this disclosure. For example, the system may be used to document different types of work that are performed by several different construction workers and/or landscapers at a particular construction site/property. For example, the system may be used to document the removal of trees from a particular yard of a residential building, the wiring within a wall within the residential building, the plumbing within a wall of the residential building, one or more property boundaries of a particular building, etc. This may allow for a user (e.g., a homeowner or commercial building owner) to have an easily accessible electronic record of all of the construction and/or landscaping done on their property over time, and/or to easily contact the individuals who were responsible for the work regarding the work.

In particular embodiments, the system may play back and/or display multiple audio, image, picture and/or video files (e.g., 2-D video and/or picture files) as part of the 3-D representation of the room (or other space). For example, the system may use an image of a chalkboard or electronic display screen that displays one or more drink or food specials for a particular evening and either: (1) use one or more data capture techniques (e.g., optical character recognition techniques) to capture text from the image and then populate a graphical representation of the chalkboard or electronic display screen, within the 3-D representation, with the captured text; and/or (2) superimpose the image over a portion of the of the 3-D representation that corresponds, at least generally, to the imaged chalkboard or electronic display. As another example, the system may play back video of two individuals who are standing in a particular location within the room (or other area) at the approximate location in the 3-D representation of the room (or other area) where the individuals were standing when they had the conversation. As a further example, the system may play audio of one or more conversations that took place within the room while displaying one or more images that were taken of the interior of the room while the one or more conversations were taking place. This can provide the viewer of the (e.g., augmented and/or modified) 3-D representation of the room (or other area) with a visual and audio recreation of what occurred within the room during a particular period of time.

In various embodiments, the system may reduce the volume of one or more conversations (or other audio files) that it plays back to re-create the background-noise "chatter" that was actually present at the time that the one or more conversations occurred. The system may synchronize the one or more videos, images, and audio files using, for example, one or more time stamps (or other suitable metadata) associated with each audio/video/image file, one or more distinct sounds from within each audio/video/image file (e.g., a distinct loud noise that was recorded in each file), video images, etc. For example, if a particular gunshot was recorded within two different videos, the system could synchronize playback of the two videos by determining when the gunshot occurred within each of the videos and then synchronizing playback of the videos so that the gunshot will occur at the same time (or at approximately the same time). This may involve, for example, starting playback of one of the videos before the playback of the other video.

When determining how to integrate one or more images (e.g., still or video images) into the 3-D representation of the room, the system may match one or more polygons from the original 3-D representation of the room with one or more corresponding polygons from each of the images to help position the images in the correct position within the 3-D representation of the room. The system may also, or alternatively, use information regarding the position, orientation, and/or location of the respective one or more portable computing devices (e.g., one or more smartphones, tablets, etc.) that were used to capture the one or more images, when the images were taken, to overlay the one or more images onto/into the 3-D representation in the correct location.

In various embodiments, the system may generate one or more avatar versions of various individuals who were in the room at a particular time and use those avatars to show the respective positions and movements of the individuals over time within the room. When creating an avatar for a particular individual, the system may, for example, use a profile picture associated with the individual to generate a lifelike "face" of the avatar so that individuals who are watching the 3-D video can understand whom each avatar represents. Alternatively, the system may create an avatar that comprises a computer-generated body and a picture of the face and/or head of the individual at issue. This may provide the viewer with an even more accurate understanding of what happened within the room within a particular time period, since it will allow the viewer to understand exactly who was in the room and where they were located (and how they were moving) over a particular period of time. For example, the viewer may select a particular time period and see the respective movements of a large number of individuals within the room during the particular time period, while also seeing and hearing multiple conversations that took place within the room within the particular time period. This may be useful, for example, in determining movement flows and behaviors of individuals within the room.

In various embodiments, the system may also be configured to review information regarding the presence, location, and behavior of various individuals within the room, and use this information to predict future activity within the room. For example, the system may analyze information over a particular period of time (e.g., a period of several weeks, months, or years) and determine that the same five people typically sit at a particular table every Friday night from about 6:30 pm-7:45 pm and discuss fantasy football. The system may also determine that a particular waitress serves seven particular tables during this time period. The system may use this information to generate a 3-D animated representation of predicted activity within the room (with moving avatars of the five people sitting at their table discussing fantasy football, and a separate moving avatar of the waitress serving the seven tables in a pattern of movements that is consistent with her past behavior when serving the tables). This may provide viewers with an approximate (in some circumstances, partial) view of what they should expect to experience if they choose to visit the room/bar on a Friday night from 6:30 pm-7:45 pm.

In particular embodiments, the system may also allow the viewer to see the view (e.g., at a particular time) from any of a plurality of particular locations within the room (e.g., from any of a plurality of particular tables). The system may also allow the viewer to insert additional virtual "people" into the 3-D environment to see how the room would look when filled with people. In one example, the system may be configured to allow an individual to facilitate the insertion of a virtual bartender (e.g., an avatar of a particular bartender) into the 3-D representation of the room. The virtual bartender may be programmed to answer particular questions and/or to recreate the regular activity of an on-duty bartender.

In determining the approximate location of individuals within the room at a particular time, the system may use triangulation techniques using, for example, signals transmitted from a plurality of portable computing devices within the room (e.g., a plurality of cell phones running a particular application). This may help to approximate the location of individuals more accurately than could be done using GPS, or other location-determination technologies, alone.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of Internet-implemented computer software. Any suitable computer-readable storage medium may be utilized including, for example, hard disks, thumb drives, compact disks, DVDs, optical storage devices, and/or magnetic storage devices.

Various embodiments are described below with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the user's computer, partly on the user's computer, as a stand-alone software package, partly on a user's computer and partly on a portable computer, or entirely on the portable computer or server. In the latter scenario, the portable computer may be connected to the user's computer through any suitable type of network, including but not limited to: (1) a local area network (LAN); (2) a wide area network (WAN); and/or (3) a cellular network. It should be understood that a particular computer's connection to the network may be made via an external computer (for example, by connecting to the internet via a "hotspot" provided by a portable wireless device).

The computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

Figure 1:
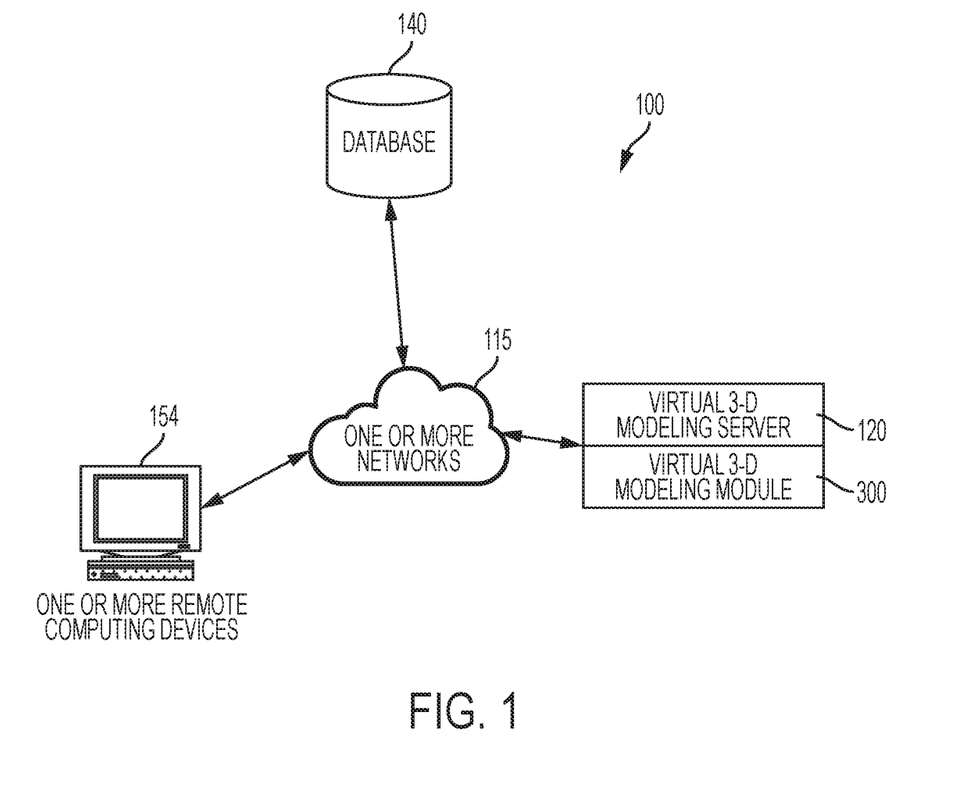
FIG. 1 is a block diagram of a virtual 3-D modeling system in accordance with an embodiment of the present system.

FIG. 1 is a block diagram of virtual 3-D modeling system 100 according to particular embodiments. As may be understood from this figure, the virtual 3-D modeling system 100 includes one or more computer networks 115, a virtual 3-D modeling server 120 that may, for example, be adapted to execute a virtual 3-D modeling module 300, a database 140, and one or more portable computing devices 154 (e.g., a smart phone, a tablet computer, a wearable computing device, a laptop computer, etc.). In particular embodiments, the one or more computer networks 115 facilitate communication between the virtual 3-D modeling server 120, the database 140, and the one or more portable computing devices 154.

The one or more networks 115 may include any of a variety of types of wired or wireless computer networks such as the Internet (or other WAN), a private intranet, a mesh network, a public switch telephone network (PSTN), or any other type of network (e.g., a network that uses Bluetooth (standard or low energy Bluetooth), beacon communication technologies (e.g., iBeacon), and/or near field communications to facilitate communication between computing devices). The communication link between the one or more portable computing devices 154 and the virtual 3-D modeling server 120 may be, for example, implemented via a Local Area Network (LAN) or via the Internet (or other WAN).

Figure 2:
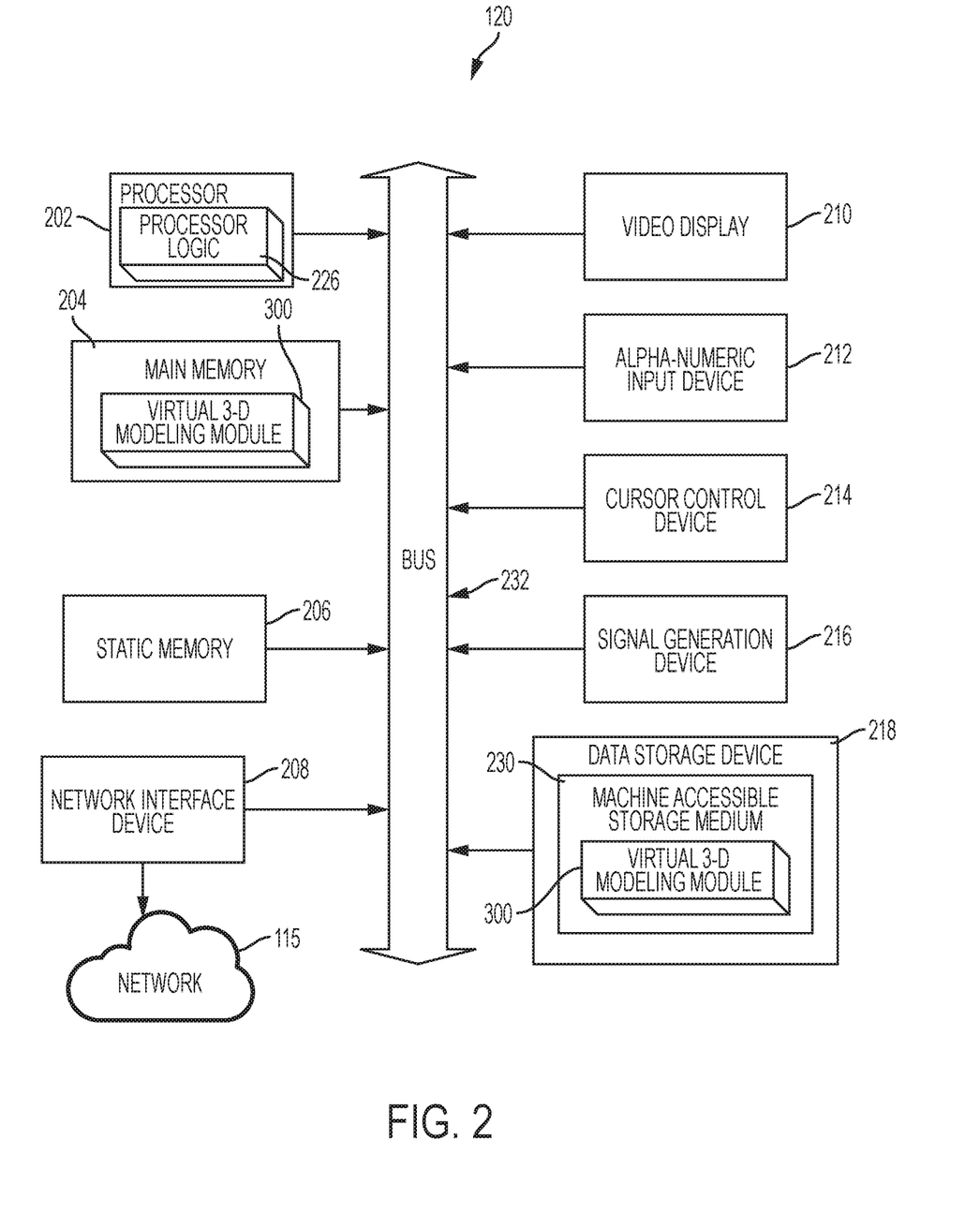
FIG. 2 is a block diagram of the virtual 3-D modeling server of FIG. 1.

FIG. 2 illustrates an exemplary diagrammatic representation of the architecture for a virtual 3-D modeling server 120 that may be used within the virtual 3-D modeling system 100. It should be understood that the computer architecture shown in FIG. 2 may also represent the computer architecture for any one of the one or more portable computing devices 154 shown in FIG. 1. In particular embodiments, the virtual 3-D modeling server 120 may be suitable for use as a computer within the context of the virtual 3-D modeling system 100 that is configured for generating a virtual 3-D representation of a particular location (e.g., a particular room within a manmade structure).

In particular embodiments, the virtual 3-D modeling server 120 may be connected (e.g., networked) to other computing devices in a LAN, an intranet, an extranet, and/or the Internet as shown in FIG. 1. As noted above, the virtual 3-D modeling server 120 may operate in the capacity of a server or a client computing device in a client-server network environment, or as a peer computing device in a peer-to-peer (or distributed) network environment. The virtual 3-D modeling server 120 may be a desktop personal computing device (PC), a tablet PC, a set-top box (STB), a Personal Digital Assistant (PDA), a cellular telephone, a web appliance, a network router, a switch or bridge, or any other computing device capable of executing a set of instructions (sequential or otherwise) that specify actions to be taken by that computing device. Further, while only a single computing device is illustrated, the single term "computing device" (or other such singular terminology referring to a computing device) shall also be interpreted to include any collection of computing devices that individually or jointly execute a set (or multiple sets) of instructions to perform any one or more of the methodologies discussed herein.

As shown in FIG. 2, an exemplary virtual 3-D modeling server 120 includes a processor 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other and other system components via a bus 232.

The processor 202 represents one or more general-purpose or specific processing devices such as a microprocessor, a central processing unit (CPU), or the like. More particularly, the processor 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like.

The processor 202 may be configured to execute processing logic 226 for performing various operations and steps discussed herein.

The virtual 3-D modeling server 120 may further include a network interface device 208. The virtual 3-D modeling server 120 may also include a video display unit 210 (e.g., a liquid crystal display (LCD) or a cathode ray tube (CRT)), an alpha-numeric input device 212 (e.g., a keyboard), a cursor control device 214 (e.g., a mouse), and a signal generation device 216 (e.g., a speaker).

The data storage device 218 may include a non-transitory computing device-accessible storage medium 230 (also known as a non-transitory computing device-readable storage medium or a non-transitory computer-readable medium) on which is stored one or more sets of instructions (e.g., the virtual 3-D modeling module 300) embodying any one or more of the methodologies or functions described herein. The virtual 3-D modeling module 300 may also reside, completely or at least partially, within the main memory 204 and/or within the processor 202 during execution thereof by the virtual 3-D modeling server 120—the main memory 204 and the processing device 202 also constituting computing device-accessible storage media. The virtual 3-D modeling module 300 may further be transmitted or received over a network 115 via a network interface device 208.

While the computing device-accessible storage medium 230 is shown in an exemplary embodiment to be a single medium, the term "computing device-accessible storage medium" should be understood to include a single medium or multiple media (e.g., a centralized or distributed database, and/or associated caches and servers) that store the one or more sets of instructions. The terms "computing device-accessible storage medium", and the like, should also be understood to include any medium that is capable of storing, encoding, or carrying a set of instructions for execution by the computing device and that causes the computing device to include any one or more of the methodologies of, for example, the present invention. The terms "computing device-accessible storage medium", "computer-readable medium" and the like should accordingly be understood to include, but not be limited to, solid-state memories, optical and magnetic media, etc.

Operation of Exemplary System

As noted above, a virtual 3-D modeling system 100, according to various embodiments, is adapted to generate a 3-D representation of a particular location (e.g., a particular room within a particular manmade structure, a particular outdoor location, or other location) for later playback by a user. Various aspects of the system's functionality may be executed by certain system modules, including the virtual 3-D modeling module 300. The virtual 3-D modeling module 300 is discussed in greater detail below.

Virtual 3-D Modeling Module

Figure 3:
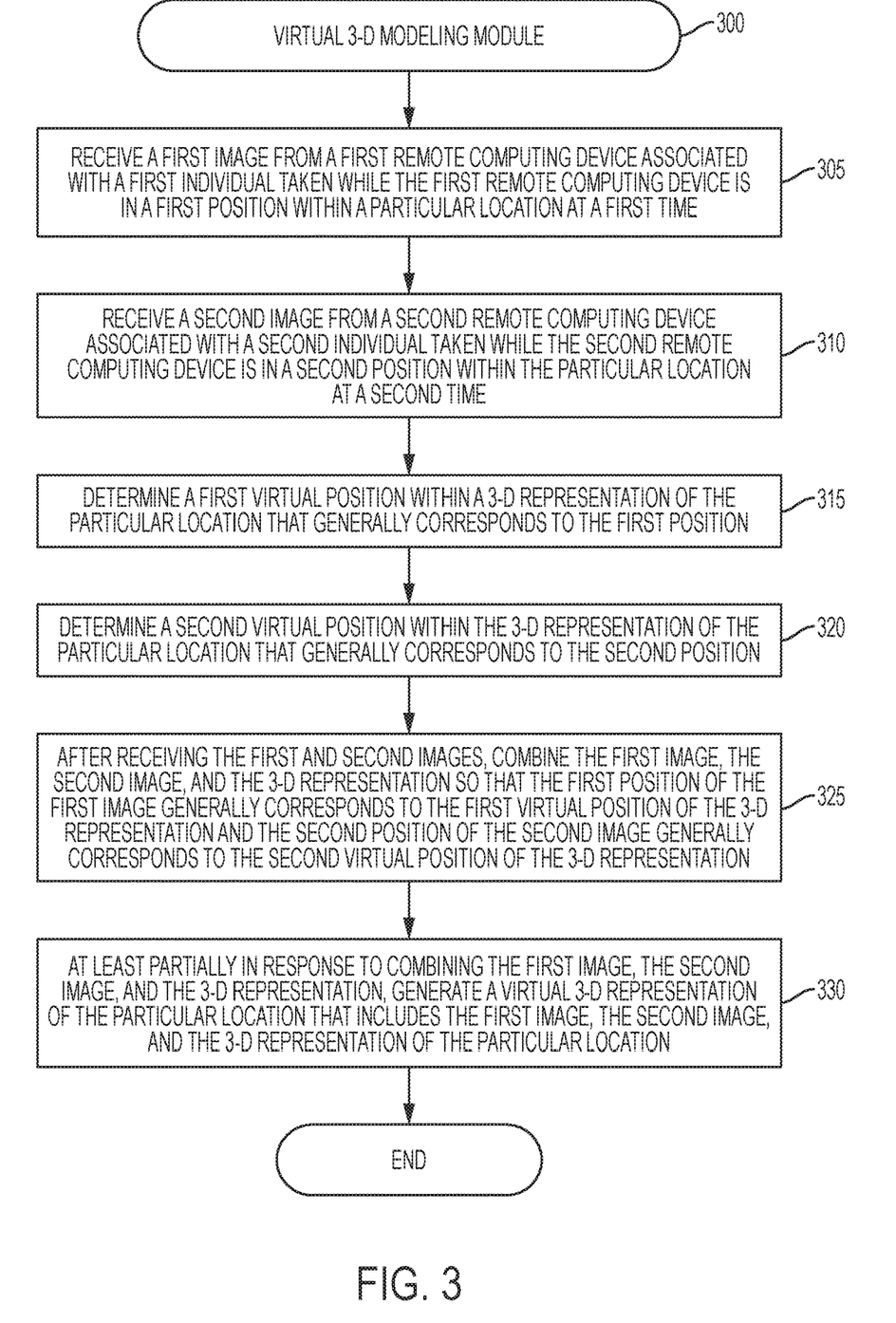
FIG. 3 illustrates a flowchart that generally illustrates various steps executed by a virtual 3-D modeling module according to a particular embodiment.

FIG. 3 is a flow chart of operations performed by a virtual 3-D modeling module 300, which may, for example, run on the virtual 3-D modeling server 120, or any suitable computing device (such as a suitable portable computing device). In particular embodiments, the virtual 3-D modeling module 300 facilitates generating a 3-D representation of a particular location.

The system begins, in various embodiments, at Step 305 by receiving a first image from a first portable computing device associated with a first individual taken while the first portable computing device is in a first position within a particular location at a first time. In various embodiments, the first image may be a two-dimensional or three-dimensional image in any suitable photo or video format (e.g., TIF, JPG, PNG, GIF, RAW, MPEG, MOV, AVI, WMV, MP4, etc.). In particular embodiments, in addition to the first image, the system may receive audio, orientation information, and location information associated with the first image and/or the device (e.g., portable computing device or other device) that is used to capture the first image. In various embodiments, the orientation information may include information regarding the physical orientation of a portable computing device (or other device) used to capture the first image, when that device captured the first image. The orientation information may include, for example, the roll, pitch, and yaw of the first portable computing device. This orientation information may have been obtained, for example, from an accelerometer, gyroscope, and/or other orientation determination device associated with the portable computing device (or other device) that was used to capture the first image.

The location data may include, for example, geolocation data for the portable computing device (or other device) that indicates the location of the portable computing device (or other device) when the device captured the first image. In particular embodiments, the audio information may include positional data for a microphone associated with the first portable computing device when the microphone was used to capture particular audio information to be played back by the system.

In some embodiments, the first portable computing device may be any suitable portable computing device (e.g., a smartphone, a tablet computer, a wearable computing device, a laptop computer, etc.). In particular embodiments, the particular location may be any suitable location (e.g., a bar, restaurant, dance hall, gym, bowling alley, movie theater, park, recreational area, etc.). In some embodiments, the particular location may include indoor and/or outdoor areas. According to various embodiments, the first position within the particular location may be any location where the first individual is standing, sitting, walking, dancing, lying, etc. In particular embodiments, the first position may be a particular area within a particular radius of the first individual. For example, the first position may include the area around the first individual within five feet of the individual.

In some embodiments, the first time may be any suitable time (e.g., a particular second, minute, hour, etc.). The system may determine the first position using a GPS unit associated with the individual's smartphone, suitable triangulation techniques, suitable beacon techniques, and/or any other suitable method for determining an individual's location. As a particular example, the system may determine the individual's location based on information provided by the individual or others on social media. For example, the system may determine the individual's location based on a recent "check in" on a social media site, such as Foursquare.

In various embodiments, the first individual may have installed a particular software application (e.g., a social media application) onto the individual's portable computing device (or other computing device) that facilitates the use of a camera associated with the individual's portable computing device (e.g., a front or rear facing camera built into the mobile computing device) to record the first image. In some embodiments, the software application may facilitate having the individual record video footage and/or take a picture in the first position and provide instructions to the individual on the type of videos and/or photos to capture. For instance, the software application may instruct the individual to stand in the middle of a room and capture a panoramic photograph of the room from that position. The 3-D modeling application may also instruct the individual to walk from one edge of the room to another while filming a video. This application may then use this information, as described herein, to: (1) facilitate building a three dimensional representation of the room (or other space); and/or (2) to augment an existing three dimension representation (e.g., 3-D model) of the room (or other space). In other embodiments, the system may allow the individual to capture images to be used on social media websites and/or applications (e.g., Facebook, Instagram, etc.) and then store the image and the timestamp/ location of the image captured by the individual.

In various embodiments, the software application may receive additional information from the individual to associate with the first image. For example, the system may allow the user to enter information concerning the particular location such as the name of the location, the address of the location, one or more people currently at the location (such as a person tagged at the location), comments, reviews, general price point, etc.

The system continues at Step 310 by receiving a second image from a second portable computing device associated with a second individual taken while the second portable computing device is in a second position within a particular location at a second time. In various embodiments, the second image may be in any suitable two-dimensional or three-dimensional image in any suitable photo or video format (e.g., TIF, JPG, PNG, GIF, RAW, MPEG, MOV, AVI, WMV, MP4, etc.). In particular embodiments, in addition to the second image, the system may receive audio, orientation information, and location information associated with the second image and/or the device (e.g., portable computing device or other device) that is used to capture the second image. In various embodiments, the orientation information may include information regarding the physical orientation of a portable computing device (or other device) used to capture the second image, when that device captured the second image. The orientation information may include, for example, the roll, pitch, and yaw of the second portable computing device. This orientation information may have been obtained, for example, from an accelerometer, gyroscope, and/or other orientation determination device associated with the portable computing device (or other device) that was used to capture the second image.

The location data may include, for example, geolocation data for the second portable computing device (or other device) that indicates the location of the portable computing device (or other device) when the device captured the second image. In particular embodiments, the audio information may include positional data for a microphone associated with the second portable computing device when the microphone was used to capture particular audio information to be played back by the system.

In some embodiments, the second portable computing device may be any suitable portable computing device (e.g., a smartphone, a tablet computer, a wearable computing device, a laptop computer, etc.). According to various embodiments, the second position within the particular location may be any location where the second individual is standing, sitting, walking, dancing, lying, etc. In particular embodiments, the second position may be a particular area within a particular radius of the second individual. For example, the second position may include the area around the second individual within five feet of the individual.

In some embodiments, the second time may be any suitable time (e.g., a particular second, minute, hour, etc.). In various embodiments, the second time may be the same as first time. In other embodiments, the second time may be different from the first time. In some embodiments, the second time may overlap with the first time.

In particular embodiments, the system may determine the second position using a GPS unit (or other location determination unit) associated with the second individual's smartphone, suitable triangulation techniques, suitable beacon techniques, and/or any other suitable method for determining an individual's location. The system may additionally, or alternatively, determine the individual's location based on information from one or more social media sites, as discussed above. In various embodiments, the second position may be the same as first position. In other embodiments, the second position may be different from the first position.

In various embodiments, the second individual may have installed a particular software application (e.g., a social media application) onto the individual's portable computing device (or other computing device) that facilitates the use of a camera associated with the individual's portable computing device (e.g., a front or rear facing camera built into the mobile computing device) to record the second image. In various embodiments, the software application may be the same software application that is installed on the first portable computing device (which is associated with the first individual). In other embodiments, the software application may be a different software application that includes the same, similar, or different functionality.

According to various embodiments, the 3-D modeling application may receive additional information from the individual to associate with the second image. For example, the system may allow the user to enter information concerning the particular location such as the name of the location, the address of the location, one or more people at the location (such as a person tagged at the location), comments, reviews, general price point, etc.

At Step 315, the system determines a first virtual position within a 3-D representation of the particular location, the first virtual position generally corresponding to the first position. In various embodiments, the system generates the 3-D representation of the particular location (e.g., based, at least in part, on one or more images taken from the first and/or second portable computing devices). In some embodiments, the system receives the 3-D representation of the particular location from a third party mapping source such as Google Maps or another provider of 3-D representations. The 3-D representation may be, for example, an animated or non-animated computer model of the particular location. The system may, in various embodiments, receive the 3-D representation of the particular location from a database of 3-D representations. In particular embodiments, the system may receive the 3-D representation of the particular location from a 3-D camera and/or 3-D scanning device that scans the interior and exterior space of a particular location. For example, the system may receive the 3-D representation from a 3-D camera or from an autonomous quadcopter (e.g., a drone) equipped with 3-D scanning technology.

In particular embodiments, the system may determine the first virtual position in response to receiving the first image. In some embodiments, the system may determine the first virtual position substantially automatically in response to receiving the first image. The system may, in various embodiments, determine the first virtual position using any suitable mapping technique. In particular embodiments, the system may determine the first virtual position using one or more triangulation techniques. In some embodiments, the system may determine the first virtual position using GPS location techniques.

In various embodiments, the system may determine the first virtual position by identifying a particular object in the first image, identifying the same particular object in the 3-D representation, and determining that the first virtual position generally corresponds to the first position based on the identification of the same particular object in each. For example, the object may be any suitable object such as a clock, a piece of furniture, a piece of art, a door, a window, etc. The system may then use any suitable algorithm, combined with any other available information, to approximate the individual's position at the particular location. Similarly, the system may determine the first virtual position by identifying a particular individual in the first image, identifying the same particular individual in the 3-D representation, and determining that the first virtual position generally corresponds to the first position based on the identification of the same particular individual in each. In various embodiments, the system may determine the orientation of the first image and the orientation of the 3-D representation to determine a first virtual position within a 3-D representation of the particular location that generally corresponds to the first position.

In particular embodiments, the system may match one or more polygons from the 3-D representation with one or more polygons from the first image to determine the first virtual position. For example, a painting in the 3-D representation may have a distinct quadrilateral shape that will at least substantially match the same quadrilateral shape found in the first image. The system may match one or more shapes to determine the first virtual position within the 3-D representation that generally corresponds to the first position. The system may also, in various embodiments, use an algorithm to identify suitable polygons for this purpose in the first image and the 3-D representation. For example, the system may use the Hough Transform technique to detect lines within the images based on the contrast changes between the neighboring pixels.

At Step 320, the system determines a second virtual position within the 3-D representation of the particular location that generally corresponds to the second position. In particular embodiments, the system may determine the second virtual position at least partially in response to receiving the second image. In various embodiments, the system may determine the second virtual position using any one or more of the techniques described above to determine the first virtual position, or any other suitable techniques.

Continuing to Step 325, after receiving the first and second images (or at any other suitable time), the system combines the first image, the second image, and the 3-D representation so that the first position of the first image generally corresponds to the first virtual position within the 3-D representation and the second position of the second image generally corresponds to the second virtual position within the 3-D representation. In various embodiments, the system may receive a plurality of images and combine the plurality of images and the 3-D representation so that a position within a particular image generally corresponds to a particular virtual position within the 3-D representation. According to various embodiments, the system may combine the first image, the second image, and the 3-D representation using any suitable image combination method. In particular embodiments, the system may combine the first image, the second image, and the 3-D representation by inlaying the first and second images into the 3-D representation. In various embodiments, the system may combine the first image, the second image, and the 3-D representation by framing the first image and the second image with the 3-D representation.

In various embodiments, the system combines the first image, the second image, and the 3-D representation by superimposing the first image and the second image over the 3-D representation. When the system superimposes the first image and the second image over the 3-D representation, the system may, in various embodiments, place the first position in the first image within the first virtual position of the 3-D representation and place the second position in the second image within the second virtual position in the 3-D representation. In various embodiments, the system converts the first image into a first 3-D video image, converts the second image into a second 3-D video image, and generates a virtual reality representation of the particular location by superimposing the first 3-D video image and the second 3-D video image over the 3-D representation of the particular location. In particular embodiments, the system may use any suitable technique to orient each of the first and second images within the 3-D representation, for example, to assure continuity between the edges of these respective images and the adjacent portions of the 3-D representation of the particular location.

In some embodiments, the system may combine the first image, the second image, and/or the 3-D representation by identifying one or more matching objects within each image, removing the corresponding one or more objects from the first image and/or the second image, and inserting the remaining portions of the first and/or second images into the 3-D representation. In particular embodiments, the system may combine the first image, the second image, and the 3-D representation by identifying a matching background within each image, removing the corresponding background from the first image and/or the second image, and inserting the remaining portions of the first and/or second images into the 3-D representation. In various embodiments, the system may combine the first image, the second image, and/or the 3-D representation by identifying one or more matching polygons within each image and combining the first and/or second images with the 3-D representation based on the one or more matching polygons.

In further embodiments, as described above, the system may combine one or more of the first and second images by using any suitable character recognition software (e.g., optical character recognition "OCR" software) to read text from within the first and/or second images and to then recreate at least a portion of that text within the 3-D representation of the particular location.

At Step 330, at least partially in response to combining the first image, the second image, and the 3-D representation, the system generates an enhanced 3-D representation of the particular location that includes at least a portion of the first image, at least a portion of the second image, and at least a portion of the 3-D representation of the particular location. In various embodiments, the enhanced 3-D representation may be in any suitable photo, video, CAD format (e.g., TIF, JPG, PNG, GIF, RAW, MPEG, MOV, AVI, WMV, MP4, etc.), or any other suitable format. In some embodiments, the enhanced 3-D representation of the particular location may be an enhanced 2-D image that conveys a 3-D effect. In particular embodiments, the enhanced 3-D representation is an enhanced animated 3-D computer model of activity at the particular location. For example, the enhanced 3-D representation may allow a user to view a room that shows individuals walking and interacting within the room, where the images of the individuals have been received from two separate users, and where one image is in the form of a video and the other image is in the form of a photograph.

In various embodiments, the system generates the enhanced 3-D representation of the particular location substantially automatically in response to combining the first image, the second image, and the 3-D representation. In some embodiments, the system may generate the enhanced 3-D representation of the particular location at least partially in response to receiving manual input from a user requesting that the system generate the enhanced 3-D representation of the particular location. In particular embodiments, the system may generate the enhanced 3-D representation of the particular location for a specified period of time. For instance, the system may generate the enhanced 3-D representation of the particular location for a second, a minute, an hour, a day, a month, a year, etc. In particular embodiments, the 3-D representation may comprise a 3-D animation of the particular location.

In some embodiments, the system may generate the enhanced 3-D representation of the particular location using any suitable servers, databases, and/or other computing devices, data structures, and/or computer hardware. In particular embodiments, the system may generate the enhanced 3-D representation of the particular location using the enhanced 3-D modeling server 120. In particular embodiments, the system may generate the enhanced 3-D representation of the particular location in association with an account associated with the user. In some embodiments, the system may generate the enhanced 3-D representation of the particular location with a timestamp of when the one or more images were received by the system and/or captured. This may allow, for example, a user to search a particular night such as a Friday night to view what the particular location looks like at a particular time.

In particular embodiments, in addition to generating the enhanced 3-D representation of the particular location, the system may also generate one or more avatars in the enhanced 3-D representation. In various embodiments, the one or more avatars comprise a depiction of one or more individuals in the particular location. For example, if a particular individual has the enhanced 3-D representation application running on their portable computing device and allows the application to view their location (e.g., at least substantially in real time), the system may obtain a profile picture from a social media account associated with the individual, and use the profile picture in creating an avatar that represents the individual. In particular embodiments, the avatar may comprise a substantially full image of the individual. In other embodiments, the avatar may comprise a portion of the image of the individual. For example, the system may create a generic avatar body and superimpose the individual's face on the head of the generic avatar body. In particular embodiments, the system may generate the one or more avatars to resemble the flow of people through the particular location. For example, the system may show the avatars moving around from the front door, to a table, to the bathroom, etc.

In various embodiments, the system may store the enhanced 3-D representation of the particular location in memory. In particular embodiments, the system may store one or more enhanced 3-D representations by category. For example, the system may combine enhanced 3-D representations by day of the week, time of day, holiday, etc. As a further example, the system may categorize the one or more enhanced 3-D representations such as by location, type of venue, type of customers, etc.

Exemplary User Experiences

Generating an Enhanced 3-D Representation of the Interior of a Restaurant

In a particular example of using the enhanced 3-D modeling module 300 to generate an enhanced 3-D representation of a particular location such as a restaurant, a first and a second user may download a software application (e.g., a social networking application) onto their respective portable computing devices (e.g., a smartphone or tablet). The first user may log into the application on the first user's portable computing device. The second user may also log into the application on the second user's portable computing device. The first and second users may be at the same restaurant and the first user may be enjoying dinner near a fireplace while the second user is grabbing a quick drink at the restaurant's bar. While the users may be at the restaurant at the same time in this particular example, in other situations, they may be at the restaurant at different times (e.g., on different days). For example, the first user may be at the restaurant at 7:00 p.m. on a Friday and the second user may be at the restaurant at 2:00 p.m. on a Saturday.

Returning to the example in which the first and the second users are at the restaurant at the same time, both users may desire to capture a particular moment (a particular toast or song performance) using their respective portable computing devices. In a particular example, because the first user is seated near the fireplace, the first user decides to take a panoramic picture of the restaurant while including the fireplace in the picture. The second user, enjoying the bartender's company, decides to take a video of the bartender mixing a brand new concoction that the bartender came up with using a particular brand of whiskey. Both users capture their respective moments using the enhanced 3-D modeling application. The users may capture images of at least some common objects (e.g., individuals, furniture, walls, decorations, lighting, etc.) as they capture their respective images.

Upon receiving the captured first and second images from each user, the system combines the images with a 3-D representation of the restaurant (e.g., the interior of a room) that the system obtained from a third party. The system may then enhance the 3-D representation of the restaurant by adding one or more portions of the first and/or second images to at least a portion of the 3-D representation. In various embodiments, the system combines the first and second images with the 3-D representation by determining where to position the images within the 3-D representation by matching one or more polygons within the first and/or second images with one or more polygons within the 3-D representation. Once the system matches the polygons, the system overlays the first and second images over the 3-D representation of the space in respective locations that correspond to the respective locations of the contents of the images at the particular location at a particular time based on the matching one or more polygons.

The system may then synchronize the playback of the images so that multiple scenes from within the space are played back synchronized as they occurred within the space.

The system may determine when to play back multiple images within the space by matching: (1) one or more time stamps associated with the respective first and second images; (2) one or more distinct sounds included within the images; and/or (3) one or more images included within the images.

In this example, the system is also configured to reduce the volume of multiple conversations within the restaurant to create an accurate simulation of the background chatter that occurred within the restaurant when the first and second images were captured.

Determining Movement Patterns

As another example of a user using the system, the user (in this case a restaurant owner) may log into the enhanced software application on the user's tablet computer. The restaurant owner may then ask the restaurant's wait staff and bartenders to carry respective portable computing devices that are able to determine the location and movement patterns of the wearer. For example, each of the respective computing devices may run the software application, which may use the respective computing devices' location tracking systems or other suitable hardware and/or software to track the movements of the wait staff and bartenders over the course of an evening. The restaurant may also advise customers to log into the enhanced software application while in the restaurant to allow the restaurant to track the movements of the one or more customers.

After the software application collects the data regarding the respective movements of the wait staff, bartenders, and customers over a particular period of time (e.g., one or more particular evenings), the system may transmit the data to a central server, which may use the information to create an animation that shows the movement of each participating wait staff member, bartender, and customer over a particular period of time. The system may then selectively display this animation (or other visual representation) to the restaurant owner, who may use the animation to, for example: (1) evaluate the performance of one or more of the restaurant owner's employees; (2) evaluate wait times for various services within the restaurant; and/or (3) evaluate physical traffic flows within the restaurant.

In particular examples, the restaurant owner may be able to determine that customers are being crowded into a front section of the restaurant near the restaurant's front door but that the restaurant's bar area is relatively open. This may allow the restaurant owner to reconfigure the layout of the restaurant to improve performance, or to advise customers to sit in the bar area so that crowding does not occur. The restaurant owner may also be able to determine that a particular table, such as an outdoor table in a corner, is being rarely visited by the restaurant's wait staff. This may aid the restaurant owner in correcting wait staff deficiencies in responsiveness, etc. In addition, the restaurant owner may be able to view other movement patterns, such as the most common path that customers take to and from the restroom. This may allow the restaurant owner to determine which tables have better placement based on the tables not being in a high traffic area.

Viewing Previous Restaurant Activity

As a further example of a user using the system, the user may log in to the enhanced 3-D modeling application on the user's computer. When logging into the application, the user may desire to see what a particular restaurant, such as Sotto Sotto, looked like on a particular past evening, such as Friday, October 23. After logging into the application, the user may begin, for example, by viewing an enhanced 3-D representation (such as any of those discussed above) of the interior of the particular restaurant. This 3-D representation may show, for example: (1) one or more food or drink specials that are displayed on any suitable display within the restaurant's interior (e.g., on a chalkboard or electronic display); (2) one or more visual representations of one or more bartenders that are currently working at the restaurant; (3) one or more visual representations of one or more wait staff that are currently working at the restaurant; (4) one or more videos taken of one or more individuals within the restaurant; (5) one or more pictures taken of one or more individuals within the restaurant; and/or (6) any other suitable images. The 3-D representation may also include playback of one or more audio recordings and/or feeds from the restaurant.

In various embodiments, the user may scroll through the enhanced 3-D representation of the particular restaurant until the user reaches the desired timeframe. For example, the user may "rewind" the enhanced 3-D representation similar to rewinding a movie in the sense that the user may see the one or more first images and the one or more second images being overlaid over the 3-D representation of the particular location in reverse chronological order. Similarly, if the user desires to go forward from a particular time, the user may see the one or more first images and the one or more second images being overlaid over the 3-D representation in chronological order. The user may also rewind or fast-forward to a particular time and then playback the enhanced 3-D representation in real-time. This may allow the user to see the type of clientele for a particular restaurant, the type of lighting, the social scene, the best table locations, and the overall activity that occurred at a particular restaurant on a plurality of different times and days.

Figure 4A:
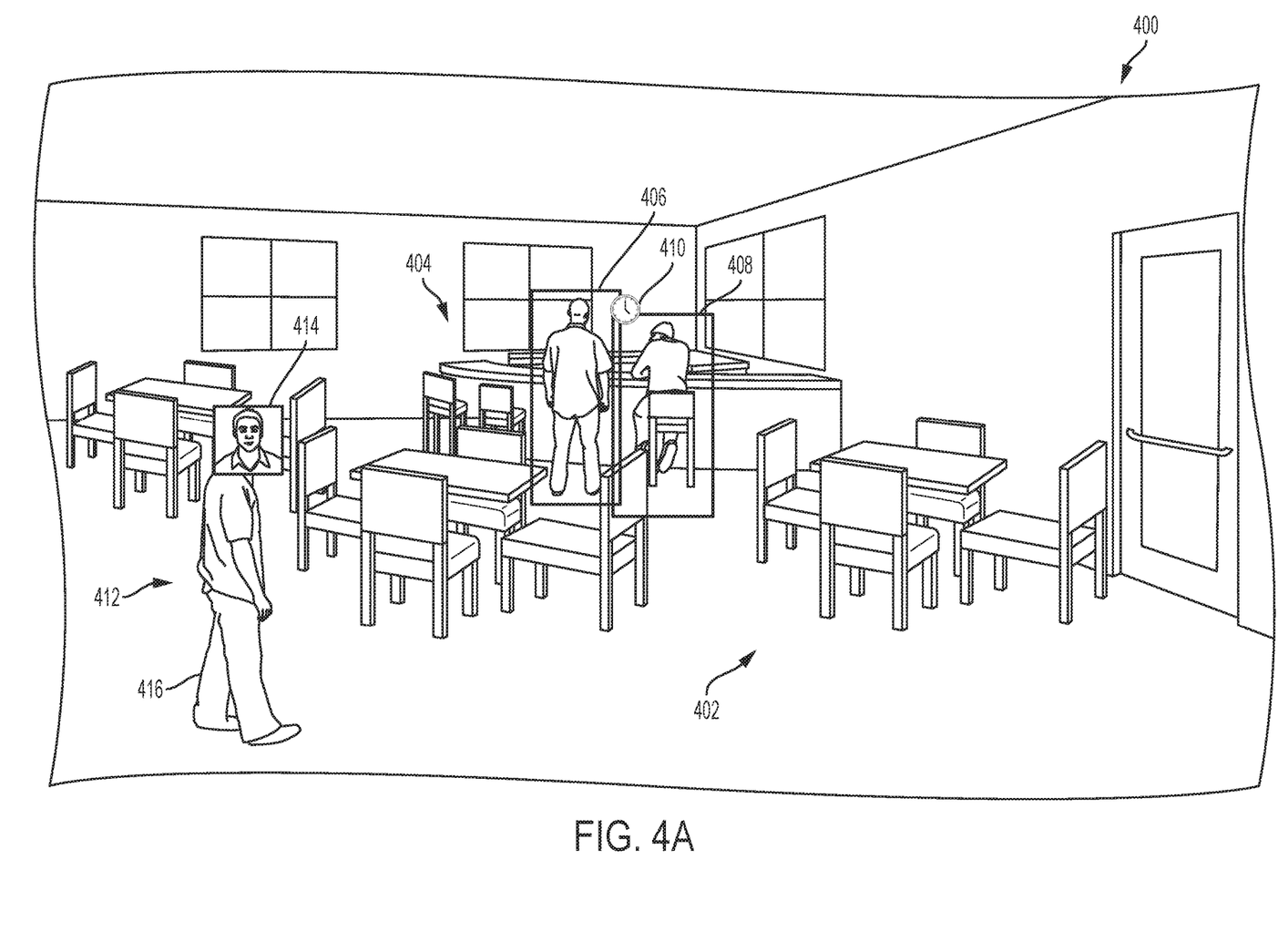
FIGS. 4A-4C are exemplary screen displays of the system according to various embodiments.
Figure 4B:
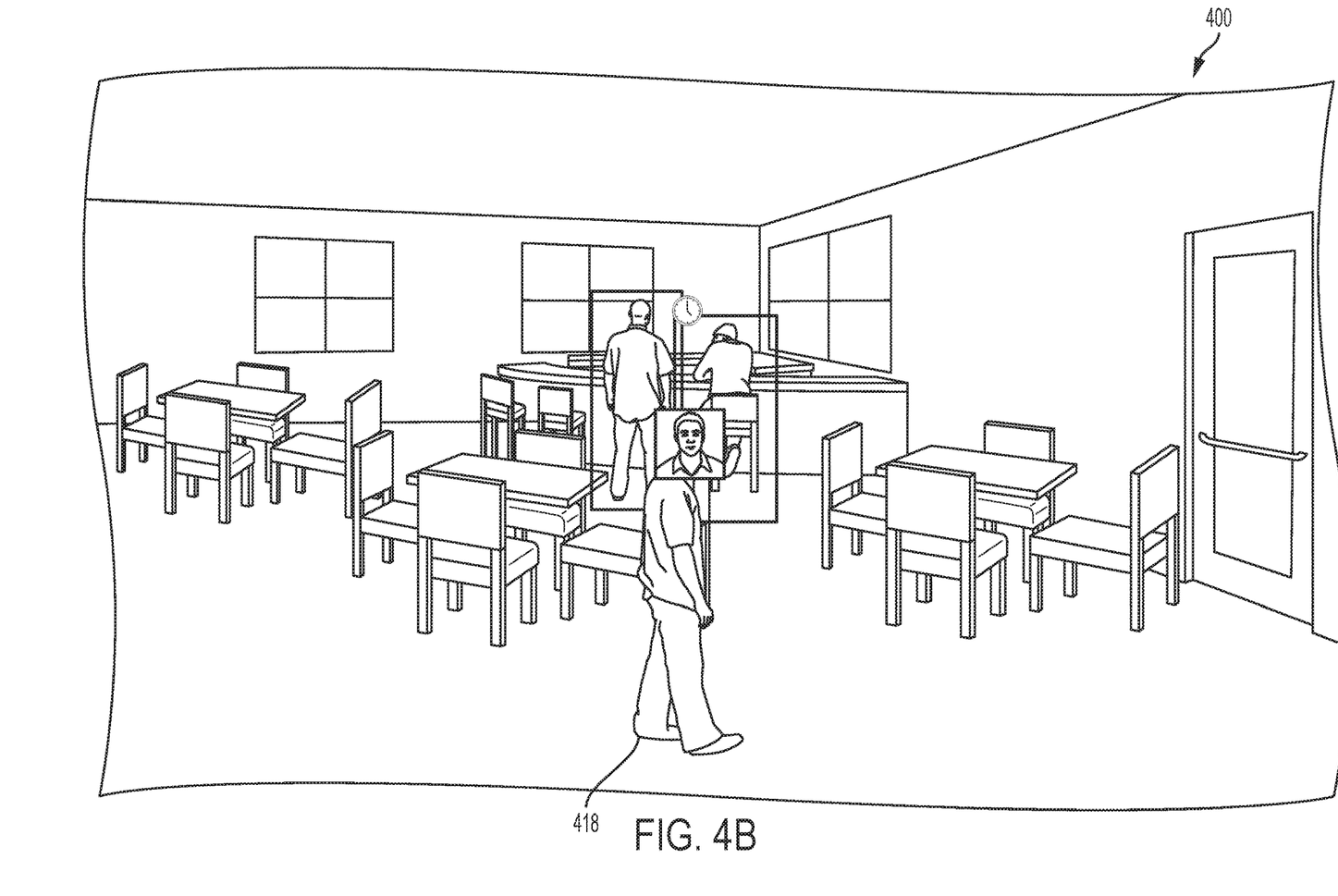
Figure 4C:
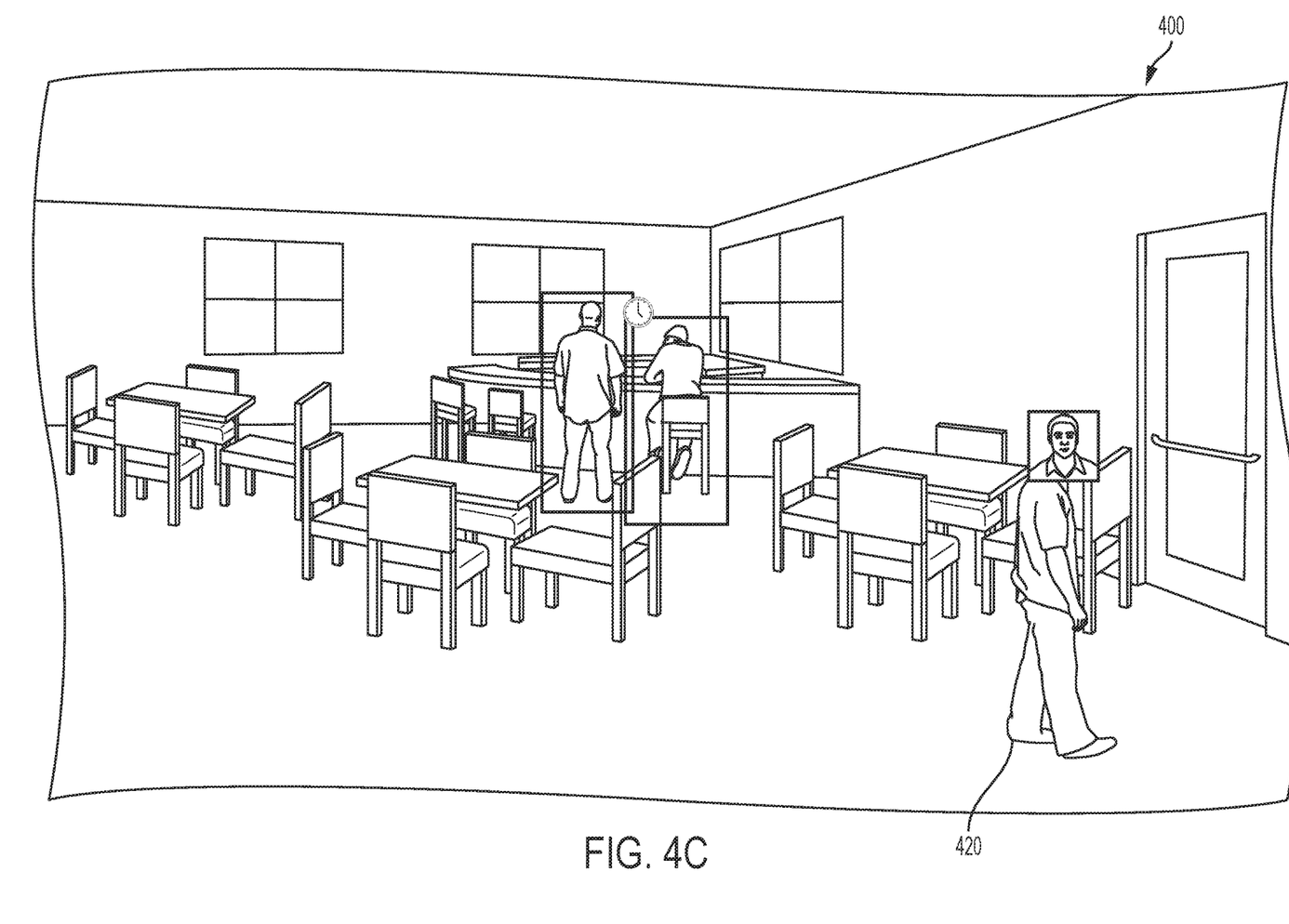

For example, as shown in FIGS. 4A-4C, the user may view the dining room 402 and bar area 404 of a particular restaurant 400. When viewing the particular restaurant 400, the enhanced 3-D modeling application may display a first image 406 received from a first user and a second image 408 received from a second user. As discussed above, the enhanced 3-D modeling application may place the first image within the first virtual position of the 3-D representation and place the second image within the second virtual position in the 3-D representation by using an object (e.g., a clock 410 found at least partially in the first image, the second image, and the 3-D representation) to determine where the first image and the second image should be placed within the 3-D representation of the particular restaurant 400. The enhanced 3-D modeling application may also display a generated avatar 412 having a user's profile picture 414 for the avatar's head. As the user plays back the enhanced 3-D representation in real-time, the enhanced 3-D modeling application shows the path that the avatar 412 travels between a first position 416 (as seen in FIG. 4A), a second position 418 (as seen in FIG. 4B), and a third position 420 (as seen in FIG. 4C).

CONCLUSION

Many modifications and other embodiments of the invention will come to mind to one skilled in the art to which this invention pertains, having the benefit of the teaching presented in the foregoing descriptions and the associated drawings. For example, although various embodiments are described above as in the context of enhancing a 3-D representation of a particular location, it should be understood in light of this disclosure that the same or similar techniques may be used to enhance a 2-D representation of the particular location. Also, it should be understood that various embodiments may be used in many different contexts, such as in the context of understanding a crime scene, understanding crowd behaviors, and/or understanding activities within a classroom. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A non-transitory computer-readable medium storing computer-executable instructions for:
   i. receiving, by at least one computer processor, a first image taken in a first position relative to a property at a first time;
   ii. receiving, by at least one computer processor, a second image taken while in a second position relative to the property at a second time;
   iii. determining, by at least one computer processor, a first virtual position within a 3-D representation of the particular property that generally corresponds to the first position;
   iv. determining, by at least one computer processor, a second virtual position within the 3-D representation of the particular property that generally corresponds to the second position;
   v. after receiving the first and second images, combining, by at least one computer processor, the first image, the second image, and the 3-D representation so that the first position of the first image generally corresponds to the first virtual position within the 3-D representation and the second position of the second image generally corresponds to the second virtual position within the 3-D representation; and
   vi. at least partially in response to combining the first image, the second image, and the 3-D representation, generating, by at least one computer processor, an enhanced representation of the particular property that includes the first image, the second image, and the 3-D representation of the particular property.

2. The non-transitory computer-readable medium of claim 1, wherein the property is selected from a group consisting of a residence and a commercial building.

3. The non-transitory computer-readable medium of claim 2, wherein the first and second individuals are construction workers.

4. The non-transitory computer-readable medium of claim 1, wherein the first image is from a first portable computing device associated with a first individual, wherein the second image is from a second portable computing device associated with a second individual, wherein the first and second individuals each respectively use a same particular software application on the first and second portable computing devices to capture, respectively, the first and second images.

5. The non-transitory computer-readable medium of claim 1, wherein the first image is a 2-D video.

6. The non-transitory computer-readable medium of claim 5, wherein the second image is a 2-D video.

7. The non-transitory computer-readable medium of claim 6, wherein at least a portion of the first and second 2-D videos were taken at the same time.

8. The non-transitory computer-readable medium of claim 7, wherein the enhanced representation of the particular property is an enhanced 3-D representation of the particular property.

9. The non-transitory computer-readable medium of claim 1, wherein the first image is a 2-D still picture.

10. The non-transitory computer-readable medium of claim 9, wherein the second image is a 2-D still picture.

11. The non-transitory computer-readable medium of claim 10, wherein the first image is from a first portable computing device associated with a first individual, wherein the second image is from a second portable computing device associated with a second individual, wherein the first and second individuals each respectively use a same particular software application on the first and second portable computing devices to capture, respectively, the first and second images.

12. The non-transitory computer-readable medium of claim 11, wherein:
   the first image is a 2-D image of a first particular construction element associated with the particular property;
   the second image is a 2-D image of a second particular construction element associated with the particular property;
   the enhanced representation of the particular property is an enhanced 3-D representation of the particular property that includes the first and second images.

13. The non-transitory computer-readable medium of claim 1, wherein the first image is from a first portable computing device associated with a first individual, wherein the second image is from a second portable computing device associated with a second individual.

14. The non-transitory computer-readable medium of claim 1, wherein combining the first image, the second image, and the 3-D representation further comprises:
   a. combining a portion of the first image with a portion of the second image; and
   b. generating the enhanced representation of the particular property that includes the portion of the first image, the portion of the second image, and the 3-D representation of the particular property, wherein:
      i. the portion of the first image comprises less than all of the first image, and the portion of the second image comprises less than all of the second image.

15. The non-transitory computer-readable medium of claim 1, wherein the method comprises:
   a. identifying a first particular object within the first image;
   b. identifying a second particular object within the second image;
   c. identifying the first particular object within the 3-D representation of the particular property;
   d. identifying the second particular object within the 3-D representation of the particular property;
   e. superimposing the first image over the 3-D representation of the space so that the first object is in substantially the same position in the first image and the 3-D representation; and
   f. superimposing the second image over the 3-D representation of the space so that the second object is in substantially the same position in the second image and the 3-D representation.

16. The non-transitory computer-readable medium of claim 15, wherein the first particular object is an object selected from a group consisting of:
   a. a portion of a particular wall;
   b. an electrical outlet;
   c. a portion of a particular ceiling;
   d. an item of vegetation; and
   e. a window.

17. A computer-implemented method for generating an enhanced representation of a particular property, the method comprising:
  i. receiving, by at least one computer processor, a first image taken in a first position within a particular location at a first time;
  ii. determining, by at least one computer processor, a first virtual position within a 3-D representation of the particular property that generally corresponds to the first position;
  iii. after receiving the first image, combining, by at least one computer processor, the first image and the 3-D representation so that the first position of the first image generally corresponds to the first virtual position within the 3-D representation; and
  iv. at least partially in response to combining the first image and the 3-D representation, generating, by at least one computer processor, an enhanced representation of the particular property that includes the first image and the 3-D representation of the particular property.

18. The computer-implemented method of claim 17, further comprising:
  i. receiving, by at least one computer processor, a second image taken while in a second position relative to the property at a second time;
  ii. determining, by at least one computer processor, a second virtual position within the 3-D representation of the particular property that generally corresponds to the second position;
  iii. combining, by at least one computer processor, the second image and the 3-D representation so that the second position of the second image generally corresponds to the second virtual position within the 3-D representation; and
  iv. at least partially in response to combining the second image and the 3-D representation, generating, by at least one computer processor, an enhanced representation of the particular property that includes the first image, the second image, and the 3-D representation of the particular property.

19. The computer-implemented method of claim 18, wherein the property is a man-made structure.

20. The computer-implemented method of claim 18, wherein:
  the first image is a 2-D image of a first particular construction element associated with the particular property;
  the second image is a 2-D image of a second particular construction element associated with the particular property; and
  the enhanced representation of the particular property is an enhanced 3-D representation of the particular property that includes the first and second images.

* * * * *